United States Patent [19]

Fernlund

[11] Patent Number: 4,558,961

[45] Date of Patent: Dec. 17, 1985

[54] CAGE FOR A ROLLING BEARING

[75] Inventor: Ingemar Fernlund, Hindås, Sweden

[73] Assignee: Aktiebolaget SKF, Gothenburg, Sweden

[21] Appl. No.: 655,629

[22] Filed: Sep. 28, 1984

[30] Foreign Application Priority Data

Nov. 11, 1983 [SE] Sweden ............................... 8306211

[51] Int. Cl.[4] ............................................. F16C 33/38
[52] U.S. Cl. ..................................... 384/526; 384/530
[58] Field of Search ............... 384/523, 526, 528, 530, 384/572, 614, 621

[56] References Cited

U.S. PATENT DOCUMENTS 3,586,405  6/1971  Claesson ............................. 384/526
4,004,840  1/1977  Johnston et al. ..................... 384/526

Primary Examiner—Stuart S. Levy
Assistant Examiner—David Werner
Attorney, Agent, or Firm—Eugene E. Renz, Jr.

[57] ABSTRACT

A cage for the rolling elements of a rolling bearing comprises two preferably equal cage halves with portions enclosing the rolling elements and with areas in which the two cage halves are connected to each other. Elastically deformable, preferably U-shaped portions connect the areas to adjoining portions of the respective cage halves. The areas are suitably arranged so that the cage halves can be connected by being snapped together by axial forces. The cage allows ununiform rolling element movements without overstressing the cage.

4 Claims, 4 Drawing Figures

CAGE FOR A ROLLING BEARING

FIELD OF THE INVENTION

The present invention relates to a cage for the rolling elements of a rolling bearing and more specifically to a cage construction characterized by novel features of construction and arrangement which is easy and inexpensive to manufacture and provides good guidance for the rolling elements and minimizes excessive stresses in the cage.

BACKGROUND OF THE INVENTION

A cage has the purpose of separating the rolling elements so that no mutual rolling element contact occurs and so that the rolling elements are evenly distributed around the bearing.

It is important for the proper function of the bearing that the contact forces between the cage and the rolling elements are as small as possible at the same time as the cage is allowed to perform its duty. There are various causes for the rolling elements to influence the cage. For example, misalignment between the outer and the inner ring of the bearing will change the shape of the orbit of the rolling elements, whereby the rolling elements impose axially directed forces on the cage. In a radially loaded bearing, the orbital speeds of the rolling elements are different in loaded and in unloaded zones of the bearing, whereby the distances between the rolling elements vary during operation. This fact causes the rolling elements to impose peripherally directed forces on the cage. Further, because of unavoidable manufacturing tolerances the rolling elements in a bearing are always of unequal sizes, which means that they tend to have unequal orbital speeds with the result that the cage is subjected to peripheral forces in both directions. Conventional cages of the above mentioned kind are made from pressed sheet metal halves which are riveted together into complete cages. Such cages are stiff, which accentuates the cage force problems caused by the above mentioned phenomena.

Some of the problems can theoretically be overcome by increasing the play between the rolling element and the cage, but too great a play is undesirable for other reasons, and thus such a measure is unsuitable.

It is known to make cages from partly a mainly rigid material with a great play between the rolling elements and partly a resilient material which encloses and contacts the rolling elements (ref. U.S. Pat. No. 2,550,912) as well as to make cages from a resilient material and surround the rolling elements by a portion of a mainly rigid material (ref. U.S. Pat. No. 2,550,911), whereby the distances between the rolling elements are permitted to vary to a certain extent. Such cages made of different materials are, however, expensive and complicated.

A cage made in one piece in which the rolling elements are snapped into position by being pressed axially from one side of the cage and in which there are resilient cage portions between the rolling element positions is known (ref. DE Offenlegungsschrift No. 2,504,741). Such a cage is assymmetrical and tends to be deformed at high rotational speeds. It can squeeze the rolling elements so that they are braked when the cage is deformed or subjected to axial forces in the bearing. The cage may even be axially expelled from the bearing during operation.

SUMMARY OF THE INVENTION

The object of the present invention is to provide a symmetrical cage which is easy and inexpensive to manufacture and which contacts the rolling elements so that good guidance is obtained and excessive stress is avoided.

A cage according to the invention can be made of one single material, e.g. plastics, and consist of only two pieces, which may suitably be identical. A bearing with such a cage can be assembled easily and quickly and can sustain high rotational speed.

BRIEF DESCRIPTION OF THE DRAWINGS

The invention is described in detail in the following with reference to the accompanying drawing, in which.

DESCRIPTION OF THE PREFERRED EMBODIMENT

A cage according to the invention comprises two annular parts (cage halves) arranged with one part on either side of the plane of the pitch circle of the rolling elements.

Figure 1:
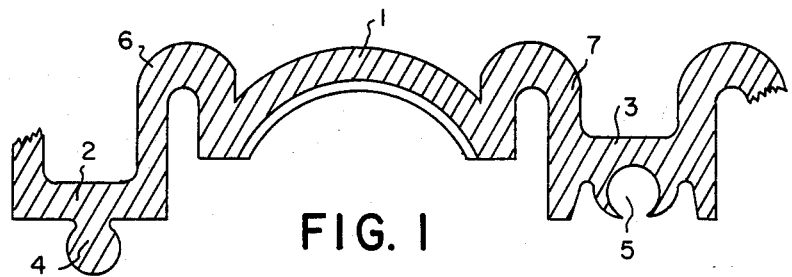
FIG. 1 and FIG. 2 show two embodiments of the invention in the form of sections of segments of cage halves extended in a plane.

FIG. 1 shows a section of a segment extended in a plane of one half of a cage for a ball bearing. A ball, not shown, is intended to be partly enclosed by a portion 1 and of a corresponding portion of an opposing cage half. The cage halves are connected to each other in areas 2, 3 situated between adjacent rolling elements, protruding portions 4 e.g. in the shape of radially arranged cylinders in the areas 2 of one cage half being snapped into corresponding recesses 5 in the areas 3 of the opposing cage half, which is not shown.

Resilient portions 6, 7 are situated between the parts 1, which enclosed the rolling elements, and the areas 2, 3 in which the cage halves are connected to each other. The resilient portions preferably have a U-shaped section, one of the legs being connected to a part 1 which encloses a rolling element and the other leg being connected to an area 2, 3 in which the cage halves are connected to each other. By the existence of the resilient portions 6, 7 in the two cage halves, those parts of a mounted cage which enclose the rolling elements are movable in relation to each other in the circumferential and axial direction of the cage. The cage can thereby be elastically deformed so that unequal rolling element movements do not cause overstressing of the cage and of the connecting members for the cage halves. In most cases a radially loaded bearing has a zone in which the rolling elements are unloaded, whereby the elasticity of the cage causes e.g. rolling elements with different orbital speeds in the loaded zone to be returned to their equilibrium positions, which relieves the stress on the cage in the unloaded zone of the bearing.

In a cage for an even number of rolling elements the two cage halves can be identically alike, whereby the areas between the portions which enclose the rolling elements are alternatingly shaped with protrusions 4 and recesses 5 according to FIG. 1. Otherwise, one cage half may be exclusively shaped with protrusions and the other cage half may be exclusively shaped with recesses.

Figure 2:
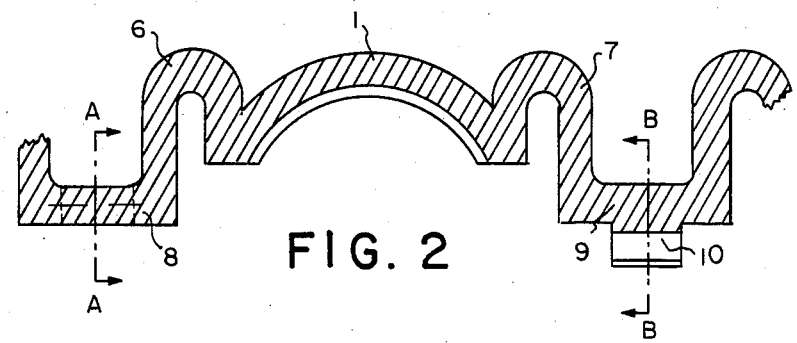
Figure 3:
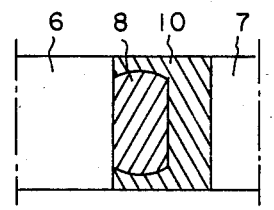
FIG. 3 shows a section according to A—A and B—B, respectively, in FIG. 2 of a cage assembled from two equal cage halves according to FIG. 2.
Figure 4:
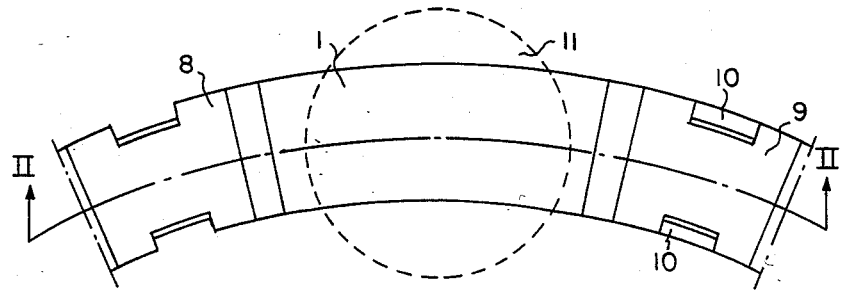
FIG. 4 shows a view in axial direction of a segment of a cage half according to FIG. 2, the section of which is shown as II—II in FIG. 4.

FIGS. 2–4 show another emodiment of the invention. The portions 1, 6 and 7 fully correspond to the portions of FIG. 1 which are given the same reference numerals, whereas the areas 8, 9 in which the cage halves are connected to each other are designed so that one area comprises a bar-shaped portion (at 8) which extends in the circumferential direction of the cage, and one area comprises two tongues 10, whereby the bar-shaped portions of one cage half is intended to be snapped in between two enclosing tongues of the opposing cage half. FIG. 3 shows a section according to A—A and B—B, respectively, of two interconnected cage halves. FIG. 4 shows a portion of a cage half from one side. The outlines of a ball 11 are inscribed in the portion 1. Other reference numerals in FIG. 4 refer to parts corresponding to parts shown in FIGS. 2 and 3 and having corresponding reference numerals.

What is claimed is:

1. A cage for the rolling elements of a rolling bearing comprising a pair of complementary annular cage members made of a flexible resilient material, said cage members being interconnected and arranged on either side of the plane of the pitch circle of the rolling elements, each cage member having circumferentially spaced first portions closely conforming to the shape of said rolling elements enclosing the same and defining portions of cage pockets for the rolling elements and second cage portions between said first portions having means for connecting the cage members and resilient third portions formed integrally with and disposed between said first and second portions, said third portions being of arcuate shape defining a flexible hinge connection permitting movement of said first portions and rolling elements relative to one another in an axial and circumferential direction of the cage.

2. A cage as claimed in claim 1 wherein said resilient third portions are of U-shaped cross section wherein one leg of the U-shaped member is connected to said first portions enclosing a rolling element and wherein the other leg is connected to said second portions wherein said annular cage members are connected to one another.

3. A cage as claimed in claim 1 wherein the second cage portions of one of said annular cage members is provided with an element which is snapped into an elastically deformable enclosing portion of said other annular cage member.

4. A cage as claimed in claim 1 wherein the annular cage members are of identical symmetrical construction and adapted for an even number of rolling elements.

* * * * *